United States Patent [19]
Kelley, Jr.

[11] 3,728,609
[45] Apr. 17, 1973

[54] ELECTRIC POWER APPARATUS COMPRISING CONVERTER, LC FILTER, AND VOLTAGE REGULATOR ARRANGED FOR HIGHLY ACCURATE AND STABLE RESPONSE

[75] Inventor: Fred W. Kelley, Jr., Media, Pa.

[73] Assignee: General Electric Company

[22] Filed: July 7, 1972

[21] Appl. No.: 269,787

[52] U.S. Cl. .................................... 321/10, 321/18
[51] Int. Cl. ............................................. H02m 1/14
[58] Field of Search ........................................ 321/10

[56] References Cited

UNITED STATES PATENTS

| | | |
|---|---|---|
| 2,710,938 | 6/1955 | Lee ................................... 321/10 X |
| 3,084,322 | 4/1963 | Rhyne, Jr. .......................... 321/10 X |
| 3,177,421 | 4/1965 | Montgomery ...................... 321/10 X |
| 3,328,674 | 6/1967 | Bleicher ............................. 321/10 X |
| 3,474,346 | 10/1969 | Schaefer ............................ 321/10 X |
| 3,510,753 | 5/1970 | Lawn .................................. 321/10 X |
| 3,577,059 | 3/1969 | Kelly, Jr. ............................. 321/10 |

*Primary Examiner*—William M. Shoop, Jr.
*Attorney*—J. Wesley Haubner et al.

[57] ABSTRACT

In electric power apparatus including a voltage-regulated converter and an LC filter supplying a load circuit with relatively smooth unipolarity voltage of desired magnitude, accuracy is promoted by using a novel proportional feedback arrangement which takes into account the IR drop across the series inductance of the filter while avoiding its dynamic transfer characteristic.

5 Claims, 3 Drawing Figures

ELECTRIC POWER APPARATUS COMPRISING CONVERTER, LC FILTER, AND VOLTAGE REGULATOR ARRANGED FOR HIGHLY ACCURATE AND STABLE RESPONSE

This invention relates to electric power conversion apparatus, and more particularly it relates to improved means for regulating the output voltage of such apparatus.

In the art of electric power conversion, it is common practice to change sinusoidal, 60-hertz alternating voltage of relatively constant magnitude (R.M.S.) to unipolarity voltage of controllable magnitude by means of solid-state electric valves known generally as controlled rectifiers and more particularly as scrs or thyristors. A thyristor can be cyclically switched from a high-resistance turned-off state to a low-resistance forward-conducting state by controlling an appropriate signal applied to its gate. For any given circuit configuration of thyristors (e.g., a 3-phase, double-way, 6-pulse rectifying bridge), the average magnitude of d-c voltage delivered by the converter will be determined by the firing angle (alpha) of the instant in each cycle that the thyristor is turned on. This mode of voltage control is commonly referred to as "phase control." In order to vary or regulate the voltage magnitude, such converters are conventionally equipped with suitable means for varying alpha as a function of a variable control signal which can be manually or automatically programmed and regulated as desired.

The DC voltage generated by a phase controlled power rectifier is inherently characterized by undulations known as "ripple." The fundamental frequency of the DC ripple is a multiple of the AC supply frequency (e.g., sixth harmonic for a 6-pulse bridge), and the amplitude of the ripple increases with increasing alpha. If the load circuit that is fed by the conversion apparatus requires relatively smooth DC voltage, it is necessary to attenuate this ripple by interposing a filter between the rectifying means and the load. The filter typically comprises series chokes and parallel capacitors whose parameters (L henrys and C farads, respectively) must be selected so that the resonant frequency of the filter is well below (e.g., less than one-tenth) that of the ripple frequency. This fixes the product of L and C. Since the per henry cost of chokes is significantly higher than the per farad cost of capacitors in high power conversion apparatus, it is economically advantageous to use the lowest possible ratio of L to C. But when this ratio is below a certain magnitude which is established by the full-load resistance of the load circuit, the system becomes underdamped.

The damping factor of the typical system of the type herein contemplated is in practice relatively small. Consequently, the response of the filter output voltage to step changes of load or abrupt changes of the AC supply voltage tends to be oscillatory. The worst case is when the conversion apparatus is unloaded, since the addition of load resistance will have some damping effect on the system.

In order to suppress the effects of power disturbances in an underdamped system, it has heretofore been suggested to connect a rate feedback network to a voltage regulating loop in a manner that tends to stabilize the load error detector in the event of parasitic source fluctuations. Where cricically damped response to step changes of load is also desired, the improvement that is the subject matter of my U.S. Pat. No. 3,577,059 has proven useful. According to that patent, the specification of which is herein incorporated by reference, a dynamically stable regulating loop in which a proportional feedback is derived from the undulating voltage output of the rectifier has superimposed thereon a rate feedback from the filter output, and the latter is designed with a loop gain that dominates system behavior in response to power disturbances.

While regulators using the technique disclosed in my prior patent are entirely satisfactory for many applications, their accuracy is not as high as may be desired in some instances. Accordingly, a general objective of the present invention is to improve the accuracy of prior art regulators while preserving their stability.

I have observed that the root cause of inaccuracy in my prior scheme is the current-dependent voltage drop across the series choke of the output filter. In order to avoid excessive size and manufacturing costs, filter chokes in practice have a characteristic distributed resistance that result in the relatively smooth voltage which is applied to the load having a lower average magnitude than the undulating output voltage of the rectifier. The difference between these average magnitudes is the IR drop of the choke. For a given magnitude of load current, this difference as a percentage of the rectifier voltage increases with alpha, thereby undesirably affecting the accuracy of any associated regulator wherein a proportional feedback signal is derived directly from the undulating voltage. Taking the proportional feedback from the filter output would improve steady-state accuracy but would make it more difficult to achieve desired dynamic stability on the occasion of short-term or transient power disturbances.

In accordance with my present invention, the problem summarized above is solved by using for the proportional feedback a signal which is representative of the sum of the filter output voltage plus whatever voltage (if any) is induced in the series inductance of the filter due to changing current therein.

My invention will be better understood and its various objects and advantages will be more fully appreciated from the following description taken in conjunction with the accompanying drawings in which.

Figure 1:
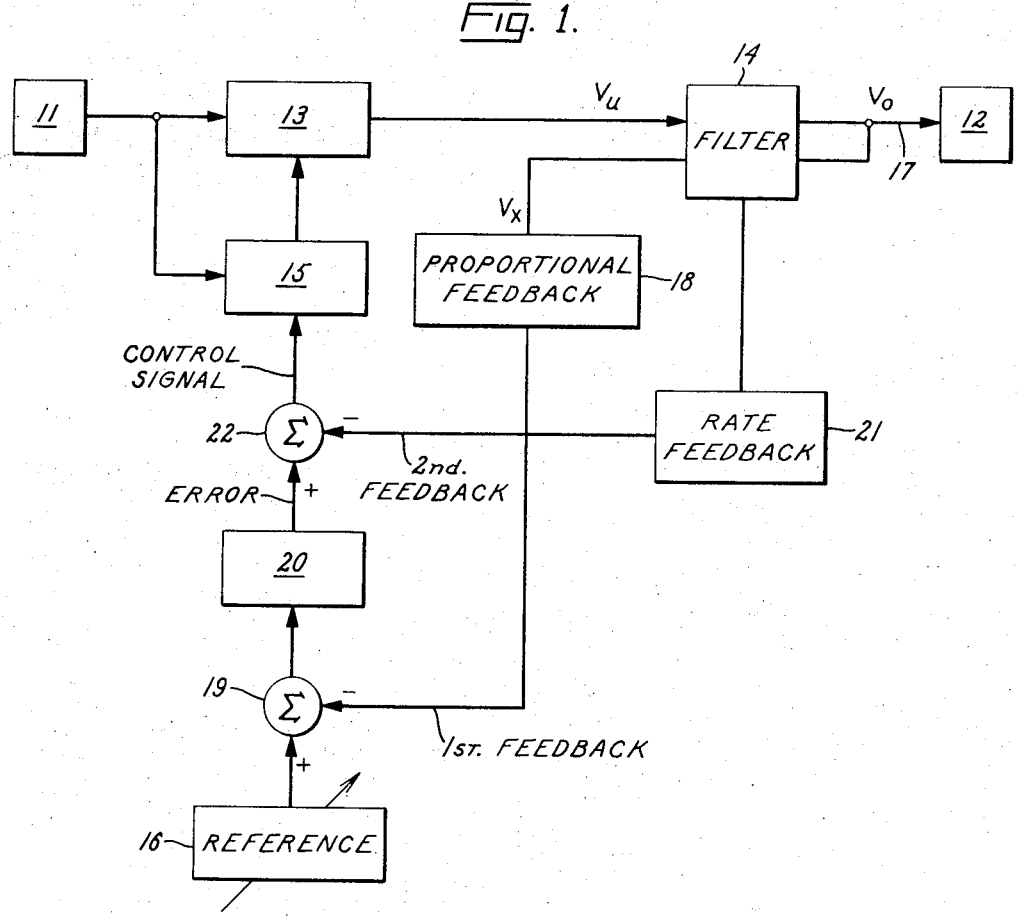
FIG. 1 is a functional block diagram of an electric power system embodying my invention.

Referring now to FIG. 1, a power supply 11 is shown connected to a load 12 by way of electric power conversion apparatus comprising a converter 13 in series with a filter 14. The supply block 11 represents any suitable source of electric power, such as 3-phase AC mains of commercial power frequency (e.g., 60 hertz) or, alternatively, an electric storage battery. The input for the converter 13 is derived from this source. The load block 12 represents any desired load circuit (not shown), such as a battery to be charged by the converter, or a plurality of electric power inverters supplying alternating voltage of adjustable frequency to a bank of variable speed AC motors. It is assumed that the load requires energization by a relatively smooth unipolarity voltage ($V_o$) of either fixed or variable magnitude, and therefore the output of the converter 13 has been coupled to the load 12 via the filter 14.

The converter 13 comprises controlled rectifying means operative to energize the filter 14 with an undulating voltage ($V_u$) whose average magnitude depends on the timing of a family of periodic trigger signals which are cyclically supplied thereto by associated gate pulse generating means 15. The timing of the trigger signals and hence the magnitude of $V_u$ can be varied by varying the magnitude of a control signal which is derived from a reference signal source 16 and which is supplied to amplifying means in the gate pulse generator block 15 as shown. This may be accomplished by a variety of different converters and gate pulse generators whose design details are well known to those skilled in the art, and a more detailed disclosure herein is believed nonessential for a proper understanding of my invention. By way of example, in one practical embodiment of the invention, the converter 13 comprised six controlled valves arranged in a conventional 3-phase double-way 6-pulse bridge configuration for rectifying sinusoidal 60-hertz power. As a possible alternative, the converter could comprise a diode bridge and controlled rectifying means appropriately connected and arranged to operate as a DC chopper (see pages 343-46 of Semiconductor Controlled Rectifiers, by F.E. Gentry et al. (Prentice-Hall Inc., Englewood Cliffs, N.J., 1964).

The filter 14 will appreciably reduce the ripple content of the undulating voltage $V_u$, whereby the d-c bus 17 which links the power conversion apparatus to the load circuit is energized by the relatively smooth output voltage $V_o$. For this purpose it typically comprises at least one series inductance element or choke (two are shown in the FIG. 2 embodiment) and parallel capacitance elements. In order to properly attenuate the d-c ripple, the resonant frequency of the filter must be well below the fundamental ripple frequency. In the interest of economy, the ratio of inductance to capacitance values is kept as low as possible, and consequently in practice a system like the one illustrated herein is underdamped.

The output voltage of the power conversion apparatus is regulated by the illustrated control circuitry in which two interdependent voltage regulating loops are used. The first loop is arranged to provide an error signal whose magnitude depends on the difference between the magnitude of the given reference or command signal and the magnitude of a first feedback signal which, in a manner soon to be explained, is derived from the output voltage $V_o$ by proportional feedback means 18. As can be seen in FIG. 1, this "proportional" loop includes summation means 19, which is supplied by both the reference and the first feedback signals, and stabilizing means 20. The stabilizing means 20 (usually a lag network) is provided to attenuate the ripple content of the first feedback signal and to affect loop gain as a function of angular frequency in a sense that prevents the proportional loop from becoming dynamically unstable. The stabilizing means 20 is connected via summation means 22 to the amplifying and gate pulse generating means 15, and the magnitude of the control signal that determines the average magnitude of the undulating voltage that energizes the filter 14 is therefore a function of the error in the proportional loop.

To stabilize the filter 14, the summation means 22 is also included in the second regulating loop whose feedback, as derived by rate feedback means 21, has a magnitude dependent on the time rate of change of the output voltage $V_o$. Consequently the magnitude of the control signal will actually depend on the difference between the error signal and the second feedback signal. In the manner taught in my prior U.S. Pat. No. 3,577,059, the dynamic transfer characteristic of the rate feedback means 21 and the various other parameters of the above-summarized regulating means are so selected that the loop gain of the rate loop dominates the loop gain of the proportional loop at frequencies in the vicinity of the natural resonant frequency of the filter 14. As a result, the second feedback signal will override the error signal during abnormal or transient variations in the power supply or in the load, thereby causing compensating changes in $V_u$ and stabilizing the response of the filter 14 to such power disturbance. Preferably the parameters are chosen so that system response to no-load power disturbances is critically damped. It will now be apparent that except for the manner in which the feedback signals are derived from the power system the regulator shown in FIG. 1 is similar in arrangement and in operation to that disclosed in my prior patent.

To increase the steady-state accuracy of my prior regulator without sacrificing dynamic stability, the proportional feedback branch of the first voltage regulating loop of the present invention comprises means coupled to the filter 14 for deriving a signal which is representative to the sum ($V_x$) of the output voltage of the filter ($V_o$) and a voltage induced in the series inductance elements of the filter due to changing current therein L$di/dt$). The average magnitude of this sum is equal to the average magnitude of the undulating voltage $V_u$ less the IR drop of the series inductance. By thus deriving the direct feedback from $V_x$, the filter transfer characteristic is eliminated in the proportional feedback loop. As a result, the regulating effect of the proportional feedback loop properly discounts the current-dependent average voltage drop across the filter, thereby improving accuracy, while retaining its fast responsiveness to transient disturbances in the power supply or in the load, thereby preserving the desired stability.

Figure 2:
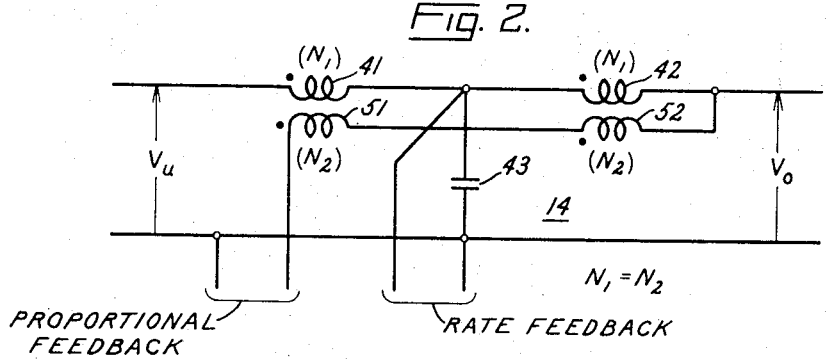
FIG. 2 is a simplified schematic circuit diagram of the filter shown in block form in FIG. 1.

The present invention can be implemented with any suitable circuit details. The embodiment shown in FIG. 2 is advantageous in a system whose filter 14 comprises a pair of series chokes 41 and 42 and parallel capacitance elements 43 arranged in a T configuration. In this particular embodiment, the proportional feedback means is connected to the output terminals of the filter 14 via a path including in series two secondary windings 51 and 52 which are inductively coupled to the chokes 41 and 42, respectively. The voltage generated in the secondary windings will be proportional to the voltage induced in the series chokes due to changing current therein. Associated windings should have a turns ratio of 1:1. More specifically, the turns $N_2$ of the secondary winding 51 should equal the turns $N_1$ of the choke 41. It will be understood that the proportional feedback signal is fed to a relatively unburdened circuit. As is shown in FIG. 2, the rate feedback is taken from across the parallel capacitor 43, whereby the rate loop of the regulator is supplied with the proper feedback signal for obtaining nearly critically damped response to a wide range of supply or load disturbances.

Figure 3:
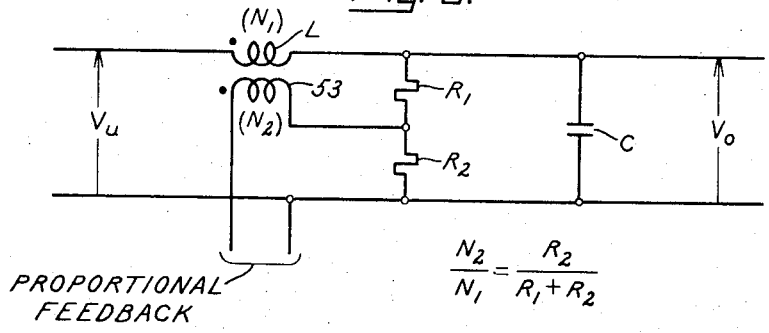
FIG. 3 is a schematic circuit diagram of an alternative embodiment of the filter shown in FIG. 2.

An alternative embodiment of the invention is illustrated in FIG. 3. Here the proportional feedback path includes a secondary winding 53 inductively coupled to a single inductance element and L and a voltage divider R1, R2 which is connected across the parallel capacitance element C. The The turns ratio of the windings should be coordinated with the ohmic ratio of the voltage divider in accordance with the following equation: $N_2/N_1 = R_2/(R_1+R_2)$.

While I have shown and described specific forms of my invention by way of illustration, other modifications will probably occur to those skilled in the art. I therefore contemplate by the concluding claims to cover all such modifications as fall within the true spirit and scope of my invention.

What I claim as new and desire to secure by U.S. Letters Pat. is:

1. In combination:
   a. electric power conversion apparatus comprising controlled rectifying means serially connected via a filter to a d-c bus which in turn is adapted to be connected to an electric power load,
      i. said rectifying means being adapted to be connected to an electric power source and being operative to energize said filter with an undulating voltage whose average magnitude depends on the magnitude of a variable control signal supplied to the rectifying means,
      ii. said filter having series inductance and parallel capacitance elements of appropriate values to attenuate the ripple in said undulating voltage, whereby a relatively smooth unipolarity output voltage is applied to said d-c bus;
   b. voltage regulating means for supplying said rectifying means with a control signal whose magnitude is a function of the difference between a given reference signal and a first feedback signal; and
   c. means coupled to said filter for supplying to said voltage regulating means a first feedback signal which is representative of the sum of said output voltage and a voltage induced in said series inductance element due to changing current therein.

2. The combination of claim 1 in which said first feedback signal supplying means includes a secondary winding inductively coupled to the series inductance element of said filter, the voltage generated in said secondary winding being proportional to the voltage induced in said series inductance element due to changing current therein.

3. The combination of claim 1 in which said voltage regulating means comprises first and second regulating loops, said first loop being arranged to provide an error signal whose magnitude depends on the difference between the magnitudes of said given reference signal and said first feedback signal, respectively, and said second loop including rate feedback means for deriving a second feedback signal whose magnitude depends on the time rate of change of voltage across said parallel capacitance element, said second loop being arranged to provide said control signal the magnitude of which depends on the difference between said error signal and said second feedback signal.

4. The combination of claim 3 in which said first feedback signal supplying means includes a secondary winding inductively coupled to the series inductance element of said filter, the voltage generated in said secondary winding being proportional to the voltage induced in said series inductance element due to changing current therein.

5. The combination of claim 3 in which said first regulating loop includes stabilizing means for attenuating the ripple content of said first feedback signal.

* * * * *